(12) United States Patent
Cheng

(10) Patent No.: US 9,367,098 B2
(45) Date of Patent: Jun. 14, 2016

(54) POWER SAVING METHOD FOR HANDHELD MOBILE ELECTRONIC DEVICE AND DEVICE USING THE SAME

(71) Applicant: HTC Corporation, Taoyuan County (TW)

(72) Inventor: Mao-Sung Cheng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 26 days.

(21) Appl. No.: 14/147,602

(22) Filed: Jan. 6, 2014

(65) Prior Publication Data

US 2014/0225660 A1 Aug. 14, 2014

Related U.S. Application Data

(60) Provisional application No. 61/762,329, filed on Feb. 8, 2013.

(51) Int. Cl.
```
G09G 5/00      (2006.01)
G06F 3/038     (2013.01)
G06F 1/16      (2006.01)
G06F 1/32      (2006.01)
G06F 3/01      (2006.01)
```

(52) U.S. Cl.
CPC ............ *G06F 1/1694* (2013.01); *G06F 1/3206* (2013.01); *G06F 1/3262* (2013.01); *G06F 3/017* (2013.01)

(58) Field of Classification Search
CPC .......... G06F 2200/1637; G06F 3/0346; G06F 21/81; G09G 2330/022; G09G 2330/02
See application file for complete search history.

(56) References Cited

U.S. PATENT DOCUMENTS

| | | | |
|---|---|---|---|
| 6,473,607 B1 * | 10/2002 | Shohara et al. | 455/343.1 |
| 8,296,686 B1 * | 10/2012 | Tedesco | G06F 19/3406 434/112 |
| 8,856,679 B2 * | 10/2014 | Sirpal | G06F 3/1438 715/790 |
| 2003/0060753 A1 * | 3/2003 | Starkweather et al. | 604/66 |
| 2006/0053315 A1 * | 3/2006 | Menzl | 713/300 |
| 2006/0087981 A1 * | 4/2006 | Sengupta et al. | 370/252 |
| 2006/0137198 A1 * | 6/2006 | Cato | 33/366.24 |
| 2010/0085325 A1 * | 4/2010 | King-Smith et al. | 345/174 |
| 2010/0134308 A1 * | 6/2010 | Barnardo et al. | 340/670 |
| 2010/0235664 A1 * | 9/2010 | Karlsson | 713/323 |
| 2012/0133833 A1 * | 5/2012 | Yoshida | 348/563 |
| 2013/0038634 A1 * | 2/2013 | Yamada et al. | 345/649 |
| 2013/0097447 A1 * | 4/2013 | Park et al. | 713/323 |
| 2014/0184502 A1 * | 7/2014 | Liu | G06F 3/0346 345/158 |

* cited by examiner

*Primary Examiner* — Kent Chang
*Assistant Examiner* — William Lu
(74) *Attorney, Agent, or Firm* — Jianq Chyun IP Office

(57) ABSTRACT

The present disclosure proposes a power saving technique to be used by a handheld mobile electronic device. In particular, the handheld mobile electronic device would execute functions including determining a tilting angle of the handheld mobile electronic device above and relative to a level surface by using a sensor, determining whether the tilting angle exceeds a first angle threshold and falls below a second angle threshold, using a first counting threshold when the tilting angle is above the first angle threshold and is below the second angle threshold, using a second counting threshold which is less than the first counting threshold when the tilting angle falls below the first angle threshold or exceeds the second angle threshold, and darkening a touch screen of the handheld mobile electronic device when the handheld mobile electronic does not receive an input within the first counting threshold or the second counting threshold.

19 Claims, 16 Drawing Sheets

POWER SAVING METHOD FOR HANDHELD MOBILE ELECTRONIC DEVICE AND DEVICE USING THE SAME

CROSS REFERENCE TO RELATED APPLICATION

This application claims the priority benefit of U.S. provisional application Ser. No. 61/762,329, filed on Feb. 8, 2013. The entirety of the above-mentioned patent application is hereby incorporated by reference herein and made a part of specification.

TECHNICAL FIELD

The present disclosure relates to a power saving method to be used by a handheld mobile electronic device and a handheld mobile electronic device using the same method.

RELATED ART

The recent trend for handheld electronic devices such as smart phones, personal digital assistants (PDA), and tablets is that more numerous and diverse functions have been integrated in these devices. Besides traditional functions such as making calls, sending or receiving messages, surfing the Internet, and listening to music, more recent devices have been equipped with larger screens, higher screen resolutions, and greater processing speeds in order to provide greater reading, entertaining, and productive functions.

Generally, handheld mobile electronic devices are intended to be carried around rather than being constantly plugged into an electrical outlet. Under circumstances in which no external power supply is immediately available to a handheld mobile electronic device, the only power source available would be the battery installed in the device. Consequently, power management has become one of the more important issues for an handheld mobile electronic device. Conventionally, a way to reduce unnecessary power consumption would be to implement some sort of power saving mode which is also known as a sleep mode. A power saving mode mode has been designed to reduce power consumption when a user does not intend to use the handheld mobile electronic device actively but also not intended to turn the device off since the device may still be relied upon to receive calls or instant messages. A properly designed handheld mobile electronic device would be controlled to enter a power saving mode according to a user's needs and current conditions to order to improve the efficiency of the battery as well as to extend the lifetime of the battery to as many hours as possible. For a typical handheld electronic device in the current market, the device would enter a sleep mode or a power saving mode after a predetermined period of inactivity in response to which the handheld mobile electronic device would darken or turn off the touch screen and lower the functions of its processing core to a bare minimum.

However, the current implementation of sleep mode or power saving mode may not have taken a user's behavior into account adequantely. For instance, if a user uses the handheld electronic device to read a book or to play a game which may require a long think, the handheld electronic device would most likely enter into a sleep mode after a minute of inactivity or so. In that case, the user typically has to push a power button in order to wake up the device quite frequently. The annoyance of having to constantly exiting the power saving mode could be compounded if a user has to unlock the screen by entering some kind of password or screen unlocking gestures.

Even if the user has figured out to use a layered menu to manually change the power saving settings of the handheld electronic device by increasing or decreasing the time of inactivity required to enter the sleep mode, the manual control would not only result in complicated operating procedures but also a waste of time. Some users might be bothered by the sleep mode feature in one's handheld electronic device but at the same time feels that it is too troublesome to manually control the power saving function from the layered menu. Therefore, the power saving function might not be carried out eventually as an avid reader might permanently turned off the sleep mode and abandon the benefit of the power saving capability which the sleep mode would provide for.

Therefore, the power saving feature of a handheld mobile electronic device could be improved on by taking smarter features into account.

SUMMARY OF THE DISCLOSURE

The present disclosure relates to a power saving method to be used by a handheld mobile electronic device and a handheld mobile electronic device using the same method. The present disclosure proposes a smarter power saving mode by taking user behaviors into account. A reading mode would be activated according to the tilting angles of the handheld electronic device. One embodiment is to enter a reading mode when the handheld electronic device is in between a first tilting and a second tilting angle. Different counting timers to measure the period of inactivity could be adopted for different circumstances. In other words, when a handheld electronic device is in the reading mode, the handheld electronic device would enter a sleep mode after a first counting period of inactivity; whereas when the handheld electronic device is not in the reading mode, the device would enter the sleep mode after a second counting period of inactivity. The first counting period of inactivity would be greater than the second counting period of inactivity. The first counting period and the second counting period could be manually adjusted. If one of the first and second predetermined period is adjusted in the menu, then the other one would automatically be adjusted accordingly.

Accordingly, the present disclosure proposes a power saving method to be used by a handheld mobile electronic device, and the method would first determine a tilting angle of the handheld mobile electronic device. The tilting angle would be measured in terms of degrees above a level surface by using a sensor. The tilting angle would be used to determine whether the tilting angle exceeds a first angle threshold and falls below a second angle threshold. When the tilting angle is in fact between the first angle threshold and the second angle threshold, the device would use a first counting threshold; otherwise a second counting threshold which is less than the first counting threshold would be used when the tilting angle falls below the first angle threshold or exceeds the second angle threshold. The device would enter a power saving mode such as darkening a touch screen of the handheld mobile electronic device when the touch screen of the handheld mobile electronic does not receive a touch input within the first counting threshold or the second counting threshold.

According to one of the exemplary embodiments, the condition of using the first counting threshold instead of the second counting threshold further includes using the first counting threshold when there is a touch input received within a non-zero default period.

According to one of the exemplary embodiments, the condition of using the first counting threshold instead of the second counting threshold further includes using the first counting threshold when the handheld mobile electronic device is in a landscape orientation or in a right side up portrait orientation such that a speaker which is native to the handheld mobile electronic device is situated higher than a microphone which is native to the handheld mobile electronic device. When a user holds the device in a landscape orientation, a reading mode could be entered as the touch screen would display contents in the landscape orientation. However, when a user holds the device in a portrait position upside down meaning that the microphone of the device is situated higher than the speaker, the reading mode would not be entered and thus the second counting threshold would be used.

According to one of the exemplary embodiments, the condition of using the second counting threshold instead of the first counting threshold includes using the second counting threshold which is less than the first counting threshold when the tilting angle falls below the first angle threshold or exceeds the second angle threshold and also when no touch input is received within the non-zero default period.

According to one of the exemplary embodiments, the condition of using the second counting threshold instead of the first counting threshold further includes using the second counting threshold when the handheld mobile electronic device is in a upside down portrait orientation such that a microphone which is native to the handheld mobile electronic device is situated higher than a speaker which is native to the handheld mobile electronic device According to one of the exemplary embodiments, the second counting threshold is configured through a menu by selecting from a list of second counting thresholds.

According to one of the exemplary embodiments, in response to the second counting threshold being configured through the menu, the first counting threshold would also be linearly scaled according to a non-zero linear proportion such that if the second counting threshold is set as 20 seconds, the first counting threshold would be automatically adjusted as 120 seconds assuming the linear proportion N is 6.

According to one of the exemplary embodiments, the first angle threshold is 30 degrees above and relative to a level surface, and the second angle threshold is 150 degrees above and relative to a level surface such that the reading mode would be entered when the tilting angle of the device is between 30 degrees and 150 degrees.

According to one of the exemplary embodiments, the first counting threshold is one minute by default, and the second counting threshold is 10 seconds by default.

According to one of the exemplary embodiments, the sensor is a G-sensor. However, any other types of on board sensors could be used as long as they provide a tilting angle of the device.

The present disclosure also proposes a handheld electronic device which includes at least but not limited to , a touch screen, a G-sensor, a processing circuit coupled to the touch screen and the G-sensor. The processing circuit is configured for functions including determining a tilting angle of the handheld mobile electronic device above and relative to a level surface by using the G-sensor sensor, determining based on outputs from the G-sensor whether the tilting angle exceeds a first angle threshold and falls below a second angle threshold, using a first counting threshold when the tilting angle is above the first angle threshold and is below the second angle threshold, using a second counting threshold which is less than the first counting threshold when the tilting angle falls below the first angle threshold or exceeds the second angle threshold, darkening the touch screen of the handheld mobile electronic device when the handheld mobile electronic does not receive a touch input within the first counting threshold or the second counting threshold.

The present disclosure also proposes a non-transitory storage medium which stores a plurality of computer readable programming codes to be loaded into a handheld electronic device to execute functions including at least but not limited to determining a tilting angle of the handheld mobile electronic device above and relative to a level surface by using a sensor, determining whether the tilting angle exceeds a first angle threshold and falls below a second angle threshold, using a first counting threshold when the tilting angle is above the first angle threshold and is below the second angle threshold, using a second counting threshold which is less than the first counting threshold when the tilting angle falls below the first angle threshold or exceeds the second angle threshold, and darkening a touch screen of the handheld mobile electronic device when the handheld mobile electronic does not receive an input within the first counting threshold or the second counting threshold.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the invention as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

A sleep mode or power saving mode of a typical handheld electronic device could be triggered in as little time as 10 seconds counting from a last activity of a user. In other words, the power saving mode could be triggered when the device does not detect any user input on the touch screen or a push of any hard buttons. However, if the period of inactivity is the consequence of a user engaging in reading materials on one's screen or playing a chess match, then the perceived inactivity would hardly be justified as an actual inactivity at all. Just as a user would concentrate on one's reading material, under the conventional design the touch screen could be darkened all in a sudden and consequently a push of a power button would be required to turn the screen back on. After the screen is turned back on, the user may have to unlock the screen first by entering a password or performing an screen unlocking gesture before one could read again and suffers the inconveniences as the end result. Therefore, the present disclosure attempts to impart more intelligence in the conventional power saving mode by proposing a reading mode which, once activated, would have the effect of delaying the sleep mode or turning off the sleep mode entirely.

Figure 1A:
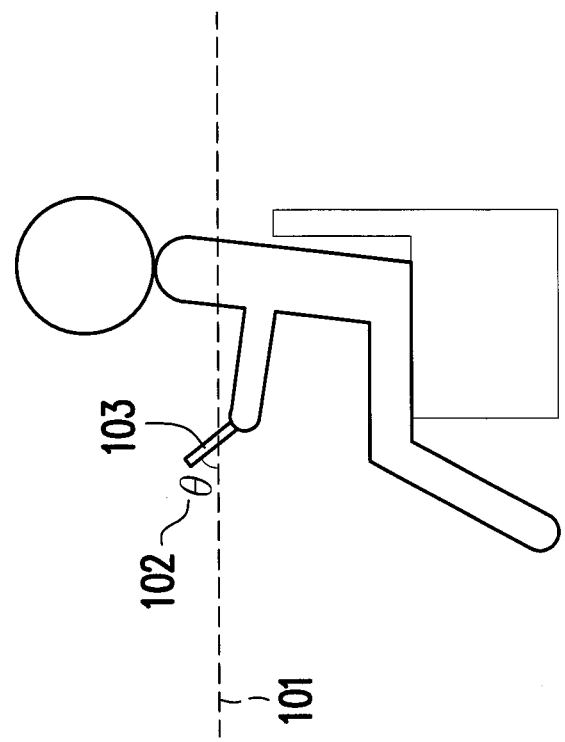
FIG. 1A illustrates of a reading mode in which a user uses one's handheld mobile electronic device to read the screen contents in accordance with one the exemplary embodiment of the present disclosure.

FIG. 1~FIG C illustrates exemplary conceptual models of various angles from the perspective of a user. FIG. 1A illustrates of a reading mode in which a user uses one's handheld mobile electronic device to read the screen contents in accordance with one the exemplary embodiment of the present disclosure. It has been observed that when a user reads contents off a screen of one's handheld mobile electronic device 103, the device 103 could be tilted by an angle θ 102, which is defined as being relative to a level surface 101 on which the user is situated. According to one of the exemplary embodiments, the device 103 may enter the proposed reading mode when the tilting angle θ 102 of the handheld electronic device 103 exceeds a first angle threshold, and the device 103 would otherwise be consider as not in the reading mode or has exited the reading mode when the tiling angle θ 102 of the device 103 is less than the first tilting threshold which corresponds to the tiling angle θ 102. Similarly, the handheld electronic device 103 would not be in the reading or would exit the reading mode if the tilt of the handheld electronic device 103 exceeds a second tilting threshold. The first and the second tilting thresholds could be predetermined thresholds such as 30 and 150 degrees respectively which has been experimentally determined as optimum tilting angles based on a study on user reading behaviors, or the tilting thresholds could be dynamically altered based on particular applications or user habits. When the reading mode is activated, the handheld electronic device 103 would still enter the sleep mode after a first counting period of inactivity which would be much longer than the conventional time of inactivity. The inactivity could be defined as the handheld electronic device 103 not receiving any input from a user including input on a touch screen or on any hard buttons. If the reading mode is not activated, the handheld electronic device 103 would enter the sleep mode after a second counting period of inactivity. The second counting period would be much shorter than the first counting period, since a longer period of inactivity would be allocated for a user who is reading.

Figure 1B:
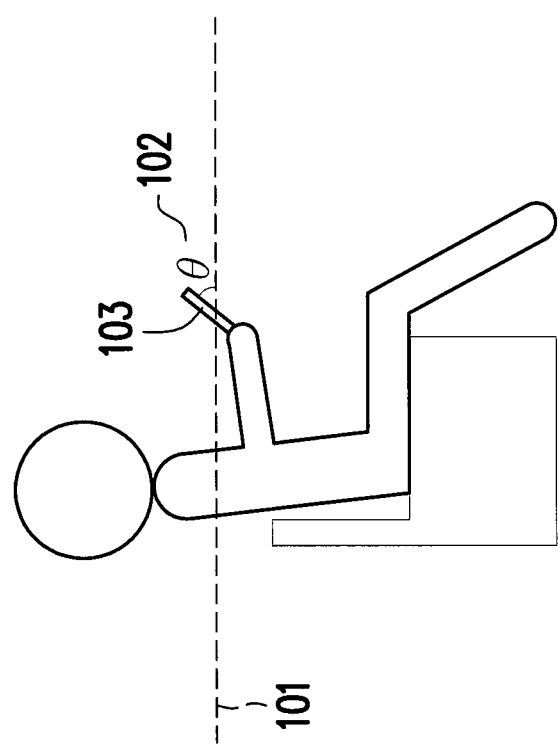
FIG. 1B illustrates the same scenario as FIG. 1A but facing an opposite direction in accordance with one the exemplary embodiment of the present disclosure.

FIG. 1B illustrates the same scenario as FIG. 1A but facing an opposite direction in accordance with one the exemplary embodiment of the present disclosure. It should be noted that when tilting the angle θ 102 is greater than the level surface 101 by a first angle threshold, the handheld electronic device 103 would enter the reading mode regardless of which direction the user is facing. Also, one way of detecting the angle θ 102 could be to use an accelerometer such as a G-sensor. When a user activates the G-sensor in general, the handheld electronic device could in general be configured to convert from a G-sensor reading into a tilting angle relative to the level surface or a G-sensor calibrated level surface. The actual algorithm to convert between G-sensor readings and tilting angles is currently well known for one skilled in the art.

Figure 1C:
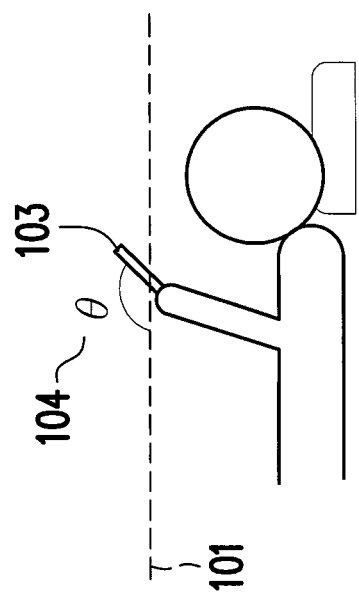
FIG. 1C illustrates reading contents of a screen of a handheld mobile electronic device while lying down in accordance with one the exemplary embodiment of the present disclosure.

FIG. 1C illustrates reading contents of a screen of a handheld mobile electronic device while lying down in accordance with one the exemplary embodiment of the present disclosure. In this exemplary scenario, a user could be lying down or sitting on a recliner in an arching position. In accordance with one of the exemplary embodiments, as long as the tilting angle θ 104 of the handheld electronic device 103 is less than the second angle threshold, the handheld electronic device 103 would enter a reading mode which is configured with the first counting threshold. If the tilting angle θ 104 of handheld electronic device 103 exceeds the second angle threshold, then the handheld electronic device 103 would not enter the reading mode and would be configured with the second counting threshold which is less than the first counting threshold.

Figure 2A:
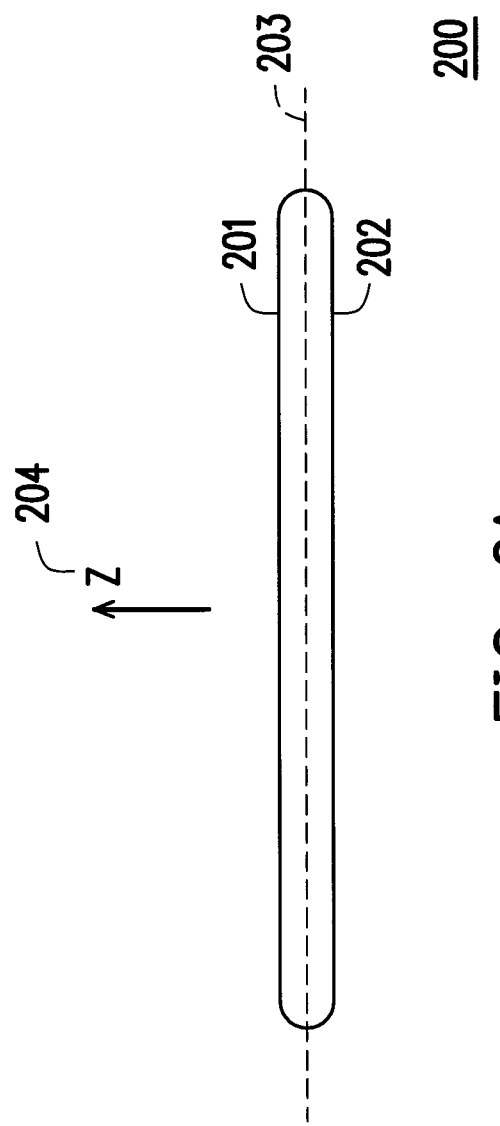
FIG. 2A illustrates a side view of a normal axis or Z axis which is normal to a handheld electronic device on a level surface in accordance with one the exemplary embodiment of the present disclosure.
Figure 2B:
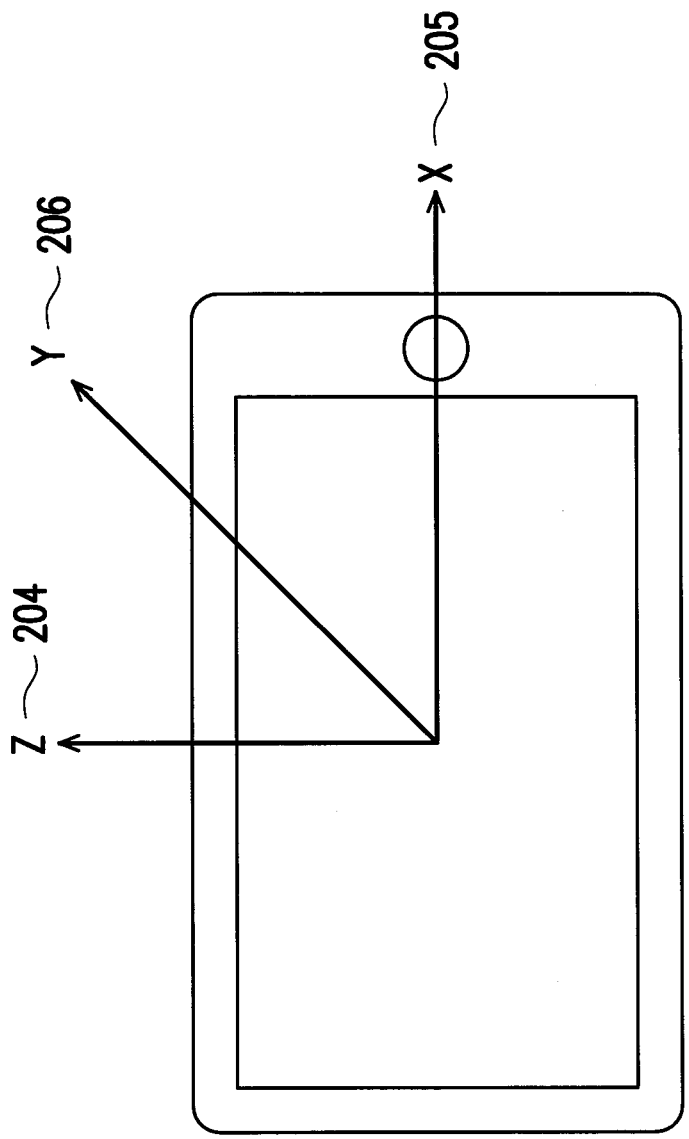
FIG. 2B illustrates a top down view of a normal axis or Z axis which is normal to a handheld electronic device on a level surface in accordance with one the exemplary embodiment of the present disclosure.
Figure 2C:
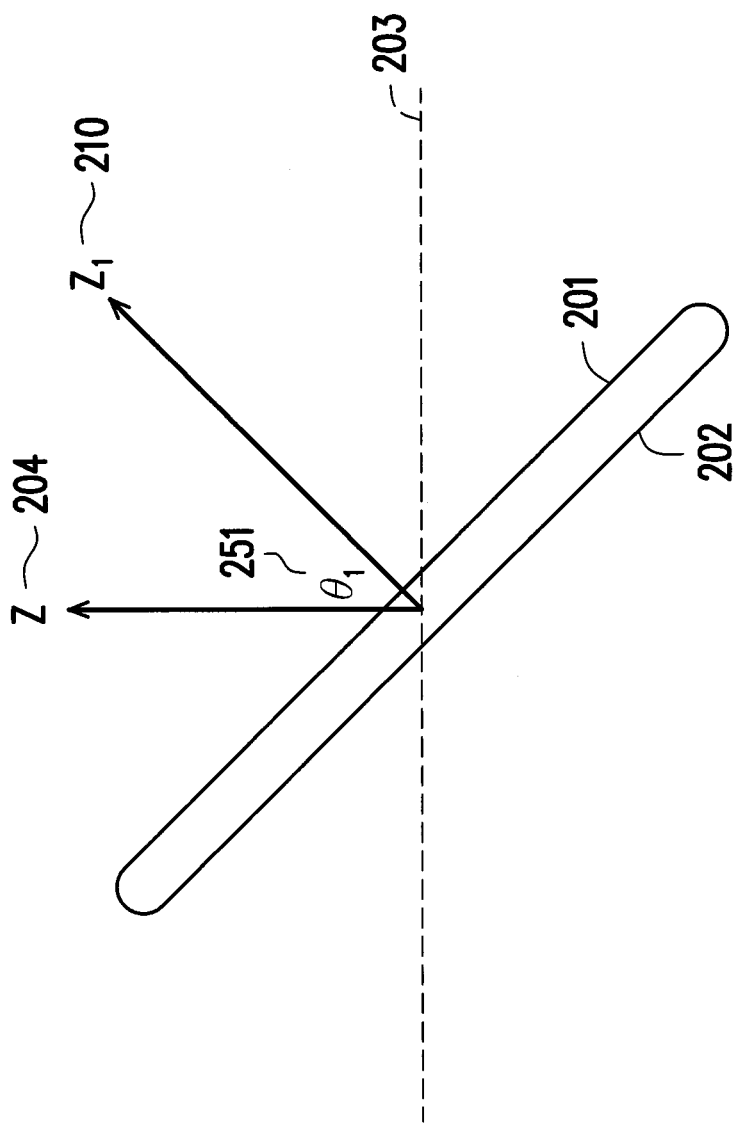
FIG. 2C illustrates a side view of the $Z_1$ axis which is defined as an axis normal to the screen of the handheld electronic device and is inclined by an angle $\theta_1$ which is relative to the Z axis in accordance with one the exemplary embodiment of the present disclosure.
Figure 2D:
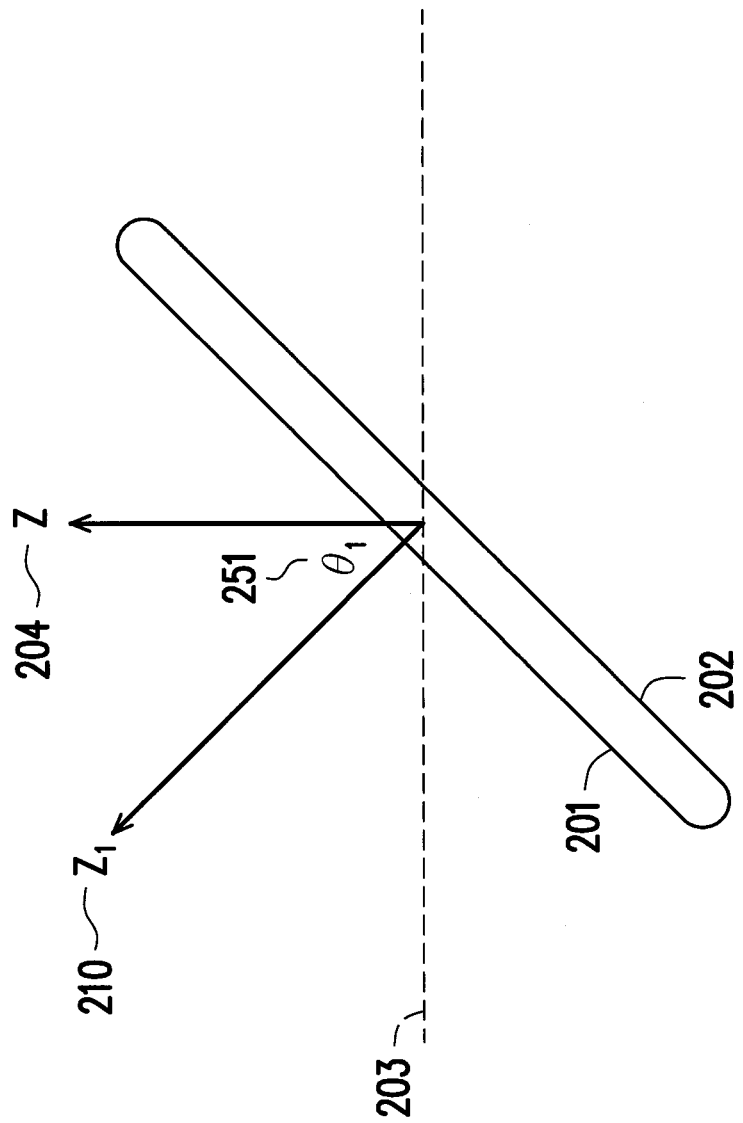
FIG. 2D illustrates FIG. 2C but facing another direction in accordance with one the exemplary embodiment of the present disclosure.
Figure 2E:
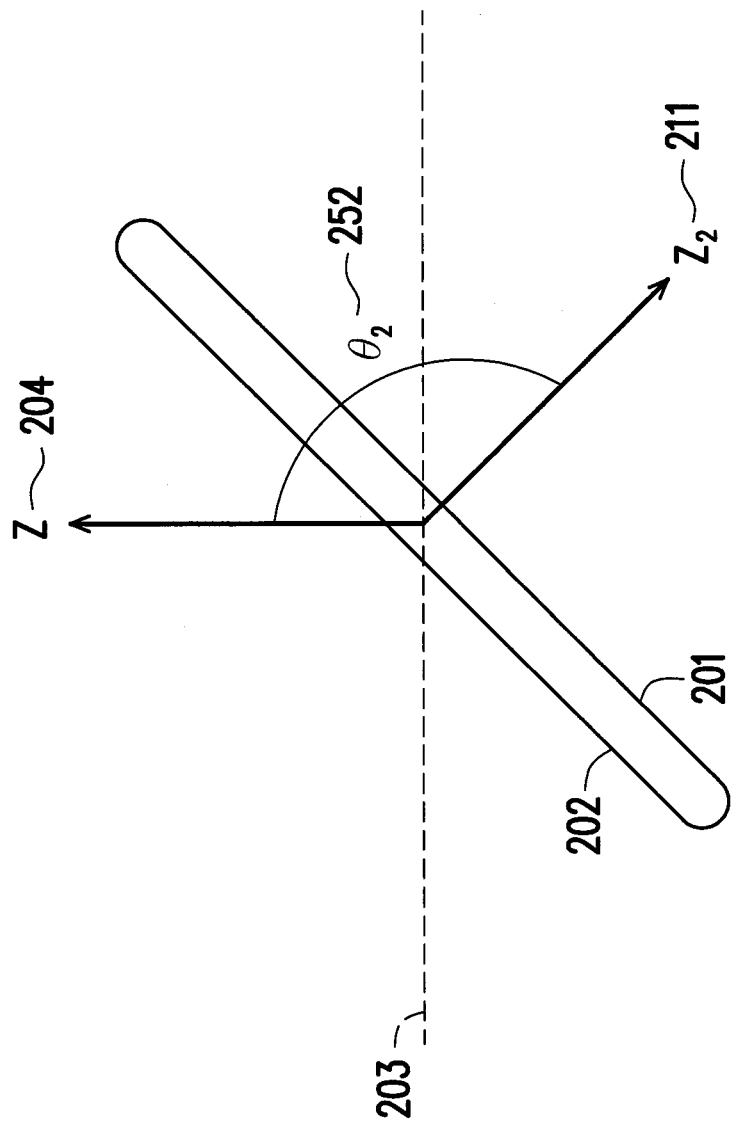
FIG. 2E illustrates a side view of the $Z_1$ axis which is defined as an axis normal to the screen of the handheld electronic device and is inclined by an angle $\theta_2$ which is relative to the Z axis in accordance with one the exemplary embodiment of the present disclosure.
Figure 2F:
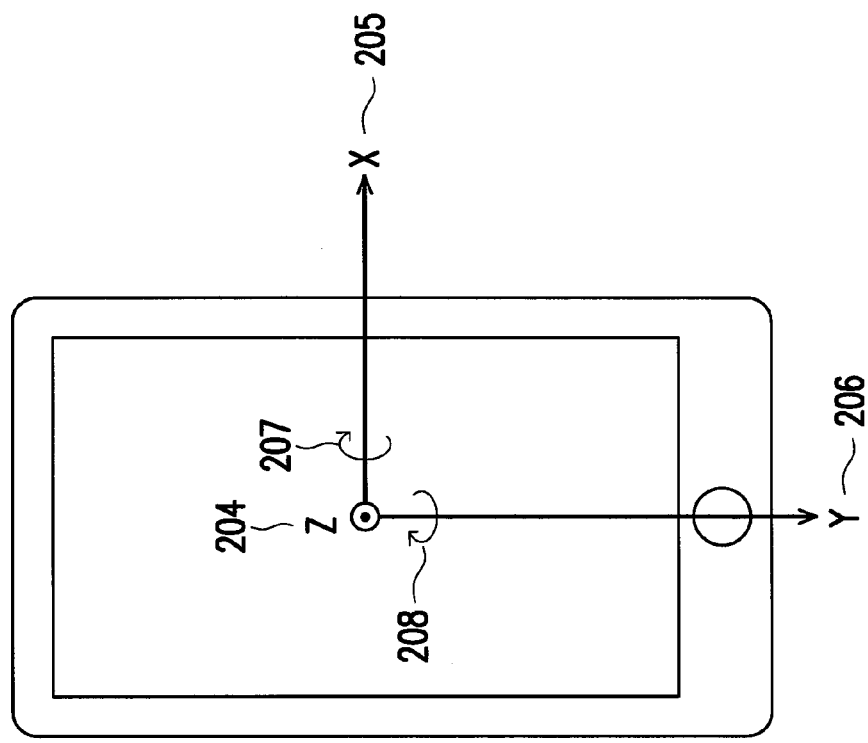
FIG. 2F illustrates tilting along X or Y axis in accordance with one the exemplary embodiment of the present disclosure.

FIG. 2A FIG. 2F provides further detailed explanations regarding tilts and angle thresholds of the proposed method. FIG. 2A illustrates a side view of a normal axis or Z axis which is normal to a handheld electronic device on a level surface. For the handheld electronic device 200, the first surface 201 is the surface which includes a touch screen, and the second surface 202 is located on the back side of the first surface. For the scenario of FIG. 2A, assuming that the handheld electronic device is situated on a level surface 203 or is calibrated relative to the surface 203, a Z axis 204 would be determined as an axis which is normal, or perpendicular, to the surface 201 containing the touch screen. Also, for all purposes of the present disclosure, the positive direction of the Z axis 204 is determined as an axis projected outward from the surface of the screen 201 as indicated by the direction of the arrow in FIG. 2A. The inclination angle of a handheld electronic device could be defined as an angle θ relative to the normal axis Z as described in latter figures, or the inclination angle could be defined as an angle relative to a leveled surface.

FIG. 2B illustrates a top down view of a normal axis or Z axis 204 which is normal to a handheld electronic device on a level surface. Assuming that the Cartesian coordinates X, Y, and Z are used for FIG. 2B, X axis 205, Y axis 206, and Z axis 204 are therefore orthogonal relative among one another. The normal direction would be considered as the normal Z axis 204 projected out from the touch screen.

FIG. 2C illustrates a side view of the handheld electronic device 200 inclined by an angle $\theta_1$ 251. The handheld electronic device 200 would include a touch screen which is disposed on the first surface 201 and is on the other side of a second surface 202. The Z axis 204 is the normal axis when the handheld electronic device 200 on a level surface 203. The $Z_1$ axis 210 is the axis directly normal or perpendicular to the touch screen of the handheld electronic device 200 which is tilted and could also be considered as the normal vector projected out from the screen which is disposed on the first surface 201. The angle $\theta_1$ 251 formed between Z and Z1 is used to determined whether the tilted handheld electronic device 200 would enter a reading mode. If the angle $\theta_1$ 251 exceeds by a first angle threshold, then the handheld electronic device 200 would enter the reading mode.

According to experiments and studies performed with users, a user would typically read contents on a screen when the tilt is at minimum 30 degrees but optimally between 40-45 degrees according to a statistical distribution. Therefore, the first angle threshold could be configured as the minimum tilting angle which is 30 degrees. In other embodiments, the tilting angle could be configured as the optimal angle. When the tilting angle $\theta_1$ 251 is less than the 30 degrees, a user would rarely be still reading. In that case, the user might actually be operating a device on a table, or otherwise, the device could just be sitting on a table and not being used. Therefore, the handheld electronic device 200 would be considered to be not in a reading mode.

FIG. 2D illustrates FIG. 2C facing another direction. FIG. 2D essentially illustrates that regardless of which way the handheld electronic device is facing, the tilting angle $\theta_1$ 251 would be the angle formed between Z axis and $Z_1$ axis.

FIG. 2E illustrates the handheld electronic device 200 in a position similar to FIG. 1C. The Z axis 204 is the axis perpendicular to the level surface 203 or in other words normal to the screen of handheld electronic device 200 when the handheld electronic device lays flat on the level surface 203. The $Z_2$ axis 211 is the axis normal to and projected out of the screen of the handheld electronic device 200 tilted by the angle $\theta_2$ 252. When the tilting angle $\theta_2$ 252 exceeds a second angle threshold, then the operating user would very unlikely to be reading contents on the screen. The second angle threshold has been determined to be maximally 150 degrees and optimally between 135 degrees to 140 degrees. The second angle threshold could therefore be defined as the maximum angle or the optimum angle. When the tilting angle $\theta_2$ 252 of the hand held electronic device is less than the second angle threshold, the handheld electronic device would enter a reading mode.

FIG. 2F illustrates the handheld electronic device 200 tilting along X 205 or Y axis 206. Regardless whether the tilt is along the X axis 205 or the Y axis 206, or whether a rolling movement 207 along the X axis 205 or a rolling movement 208 rolling along the Y is applied, the tilting angle would defined as the angle between the axis normal to the screen and the axis normal to the level surface. According to one exemplary embodiment, when the tilting angle of handheld electronic device 200 is in between the first angle threshold and the second angle threshold, then the handheld electronic device 200 is considered to be in the reading mode. The handheld electronic device 200 in the reading mode would adopt a first counting threshold, and handheld electronic device 200 not in the reading mode would adopt a second counting threshold where the first counting threshold would be longer than the second counting threshold. In more concrete terms, the handheld electronic device 200 could for example be controlled to be in the reading mode when the tilting angle is between 30 degrees and 150 degrees. Also as an example, the handheld electronic device 200 in the reading mode would need to be inactive for longer than the first counting threshold before the sleep mode would be entered. The handheld electronic device 200 not in the reading mode would need to be inactive for more than the second counting threshold before the sleep mode would be entered. The first counting threshold as in the reading mode would be longer than the second counting threshold so that the device would not enter a power saving mode too frequently to be of major inconvenience.

Figure 3:
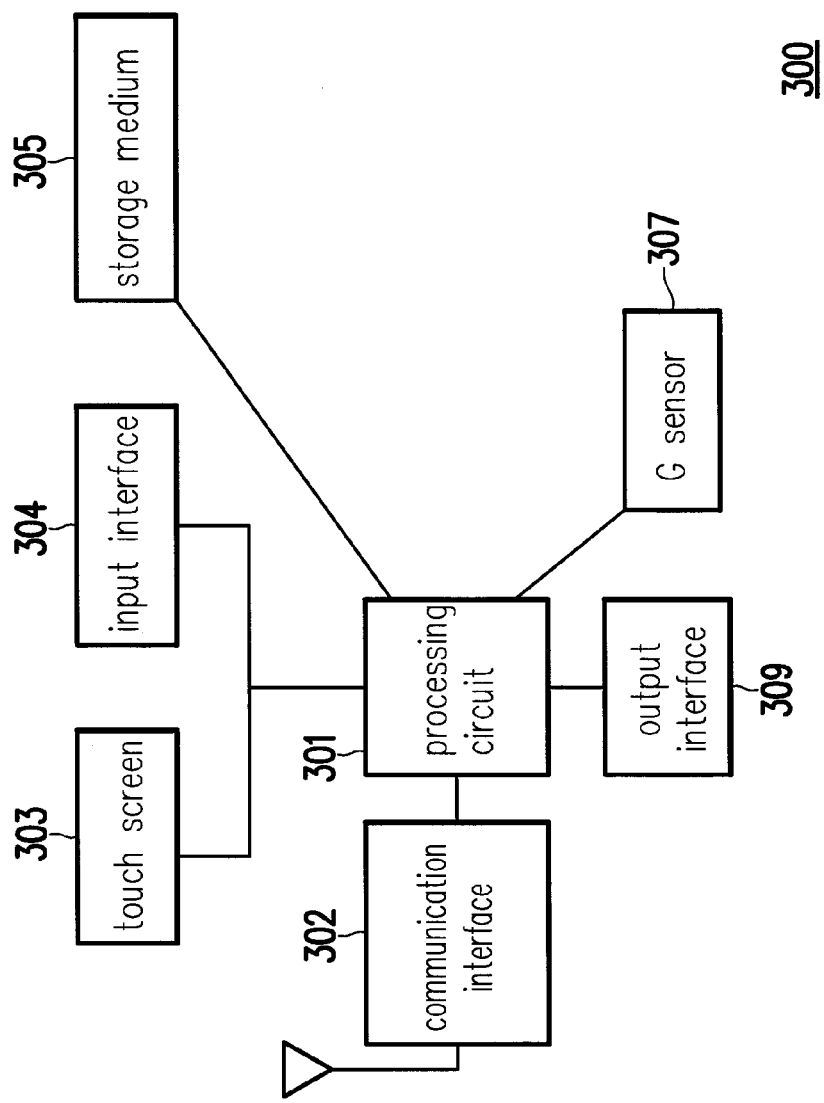
FIG. 3 illustrates a handheld mobile electronic device in terms of functional block diagrams in accordance with one the exemplary embodiment of the present disclosure.

FIG. 3 illustrates an exemplary handheld mobile electronic device such as the device 200 used in the scenarios of FIG. 1A~FIG. 2F in terms of a functional block diagram. An exemplary mobile electronic device could be a smart phone, a mobile phone, a person digital assistant (PDA), a tablet, and so forth. The exemplary mobile electronic device of FIG. 3 would include a processing circuit 301. The processing circuit 301 would be electrically coupled to at least but not limited to a communication interface 302, a touch screen 303, an input interface 304, a storage medium 305, a G-sensor 307, an output interface 309.

The processing circuit 301 may include at least one of a micro-controller, a North Bridge, a South Bridge, a field programmable array (FPGA), a programmable logic device (PLD), an application specific integrated circuit (ASIC), or other similar device, or a combination thereof. The processing circuit 301 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary mobile electronic device and would execute functions related to the proposed method of the present disclosure.

The communication interface circuit 302 could include components such as a protocol unit which support signal transmissions of a global system for mobile communication (GSM), a personal handy-phone system (PHS), a code division multiple access (CDMA) system, a wireless fidelity (Wi-Fi) system or a worldwide interoperability for microwave access (WiMAX). The communication interface circuit 302 would also provide wireless access by including components at least but not limited to a transmitter circuit and a receiver circuit.

The touch screen 303 may contain a display such as a liquid crystal display (LCD), a light-emitting diode (LED) display, a field emission display (FED) or other types of display.

The input interface 304 could be, for example, an input device such as a mouse, a keyboard, a joystick, a wheel, and so forth and would receive an input operation from a user. The input interface 304 may also include a resistive, a capacitive or other types of touch sensing device which would be integrated as a part of the touch screen 303.

The storage medium 305 could volatile or permanent memories which would store buffered or permanent data such as compiled programming codes used to execute functions of the exemplary mobile electronic device.

The G-sensor 307 would be a type of accelerometer for detecting acceleration and outputting acceleration measurement having X, Y, and Z vector components. The processing circuit 301 may convert outputs of the G-sensor having X, Y, and Z vector components into tilting angles relative to a calibrated surface.

The output interface 309 would include at least but not limited to a speaker, a vibrating oscillator, and one or more light emitting diodes (LED).

Figure 4:
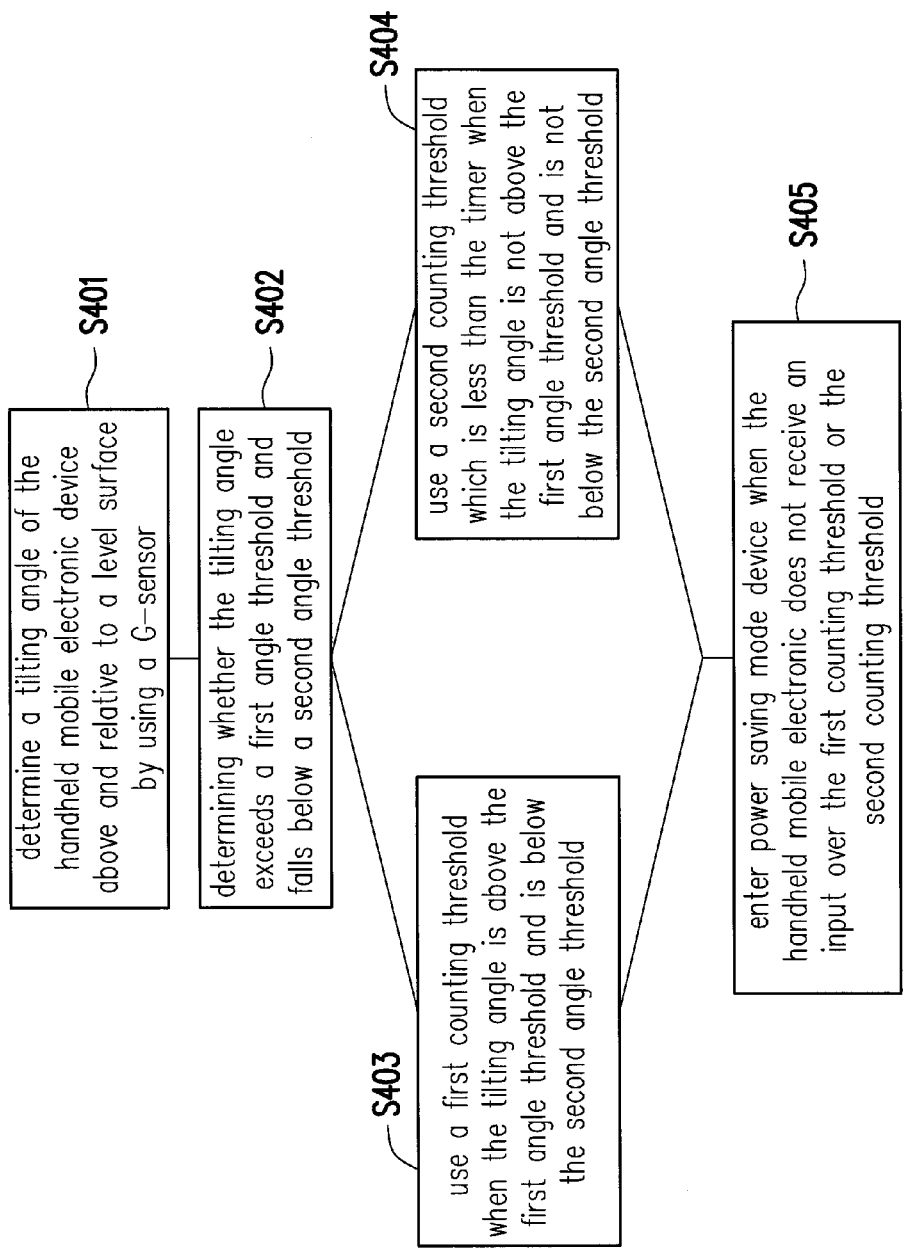
FIG. 4 illustrates the proposed power saving method in accordance with one of the exemplary embodiments of the present disclosure.

FIG. 4 is a flow chart which illustrates the proposed power saving method in accordance with one of the exemplary embodiments of the present disclosure. In step S401, the processing circuit 301 would determine the tilting angle of the handheld mobile electronic device 300 above and relative to a calibrated flat surface such as the scenario of FIG. 1A by using a G-sensor 307. The tilting angle could also be determined by comparing the difference between the normal vector of a calibrated flat surface and the normal vector projecting directly out of the touch screen 303. Any surface could be considered a flat surface if the G-sensor 307 has been calibrated on that particular surface as calibrating the G-sensor 307 is currently known in the art. In step S402, the processing circuit 301 would determine whether the tilting angle exceeds a first angle threshold and falls below a second angle threshold. For example, the processing circuit 301 could determine whether is tilting angle is between 45 degrees and 135 degrees based on the reading of the G-sensor 307. In step S403, a first counting threshold would be used when the tilting angle is above the first angle threshold and is below the second angle threshold. In step S404, in the case when the tilting angle is not above the first angle threshold and is not below the second angle threshold, a second counting threshold would be used. In step S405, the processing circuit 301 would enter a power saving mode such as by darkening the touch screen 303 of the handheld mobile electronic device 300 when the touch screen 303 and input interface 304 do not detect any input signals for a duration exceeding the first counting threshold or the second counting threshold.

Figure 5:
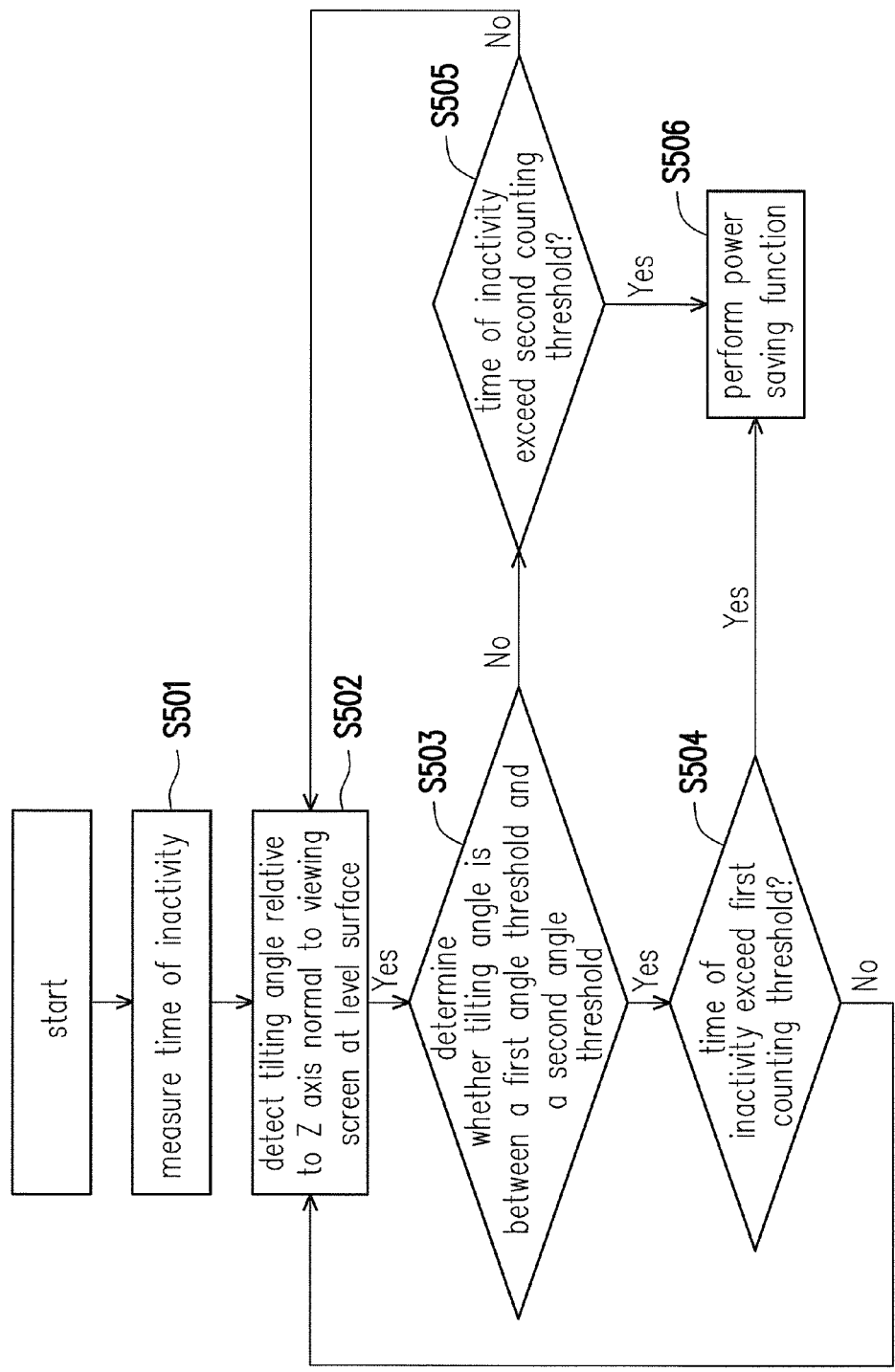
FIG. 5 is a flow chart which illustrates an exemplary embodiment of FIG. 4 in accordance with the present disclosure.

FIG. 5 is a logical flow chart illustrating one of the exemplary embodiments of the method of FIG. 4 in accordance with the present disclosure. In step S501, after a previous sleep mode/power saving mode or screen lock has been exited, a timer (not shown) would start measuring the time of user inactivity. In step S502, the G-sensor 307 could be used to detect a tilting angle of the handheld mobile electronic device 300. As mentioned previously, the tilt could be defined as a tilt above and relative to a level surface, or it could be defined as angle between the axis normal to the screen and the axis normal to the level surface. In step S503, the device 300 would determine whether the tilting angle is between the first angle threshold (e.g. 45 degrees) and the second angle threshold (e.g. 135 degrees). If the tilting angle is between 45 degrees and 135 degrees, then the device in determined by the processing circuit 301 to be in the reading mode. In that case, in step S504, the second counting threshold is would be used by the timer which would determine whether the period of inactivity has exceeded the second counting threshold. If in step S503, the tilting angle is not between 45 degrees and 135 degrees, the device is determined to be not in the reading mode. In that case, in step S505, the timer would the second counting threshold which is shorter than the first counting threshold. The first counting threshold could be one minute by default and the second counting threshold could be set 10 seconds. In step S506, if no input activity has been detected by the device 300 for over the first counting threshold as in step S504 or the second counting threshold as in step S505, the processing circuit 301 would configured the device 300 to enter a power saving mode. Otherwise, in case that user activity has been detected, the procedure in step S505 or step S504 would proceed from step S502.

In some exemplary embodiments, whether there is user input could affect the selection between a first counting threshold and a second counting threshold. In previous embodiments described thus far, the selection between the first counting threshold and the second counting threshold is mostly determined by the tilt of the handheld mobile electronic device. However, the selection could be also determined by taking whether there is any user input into account in conjunction with the tilting of the handheld mobile electronic device.

Figure 6:
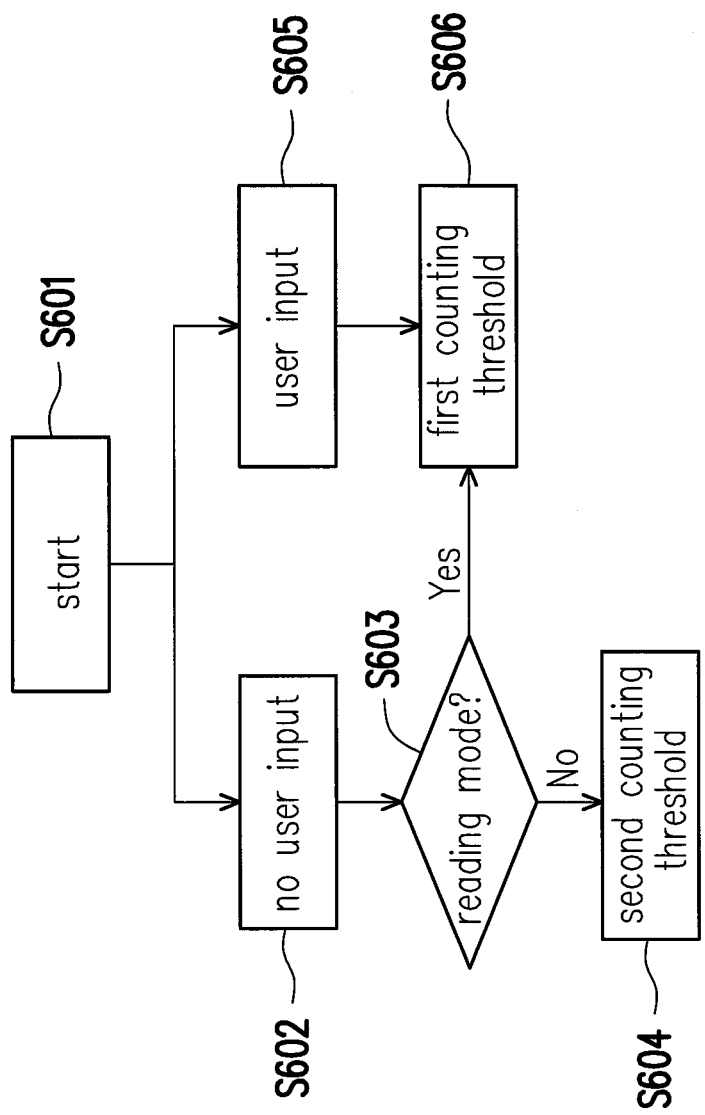
FIG. 6 illustrates the procedure of select a first counting threshold or a second counting threshold based on the presence of user inputs in accordance with one of the exemplary embodiments of the present disclosure.
Figure 7:
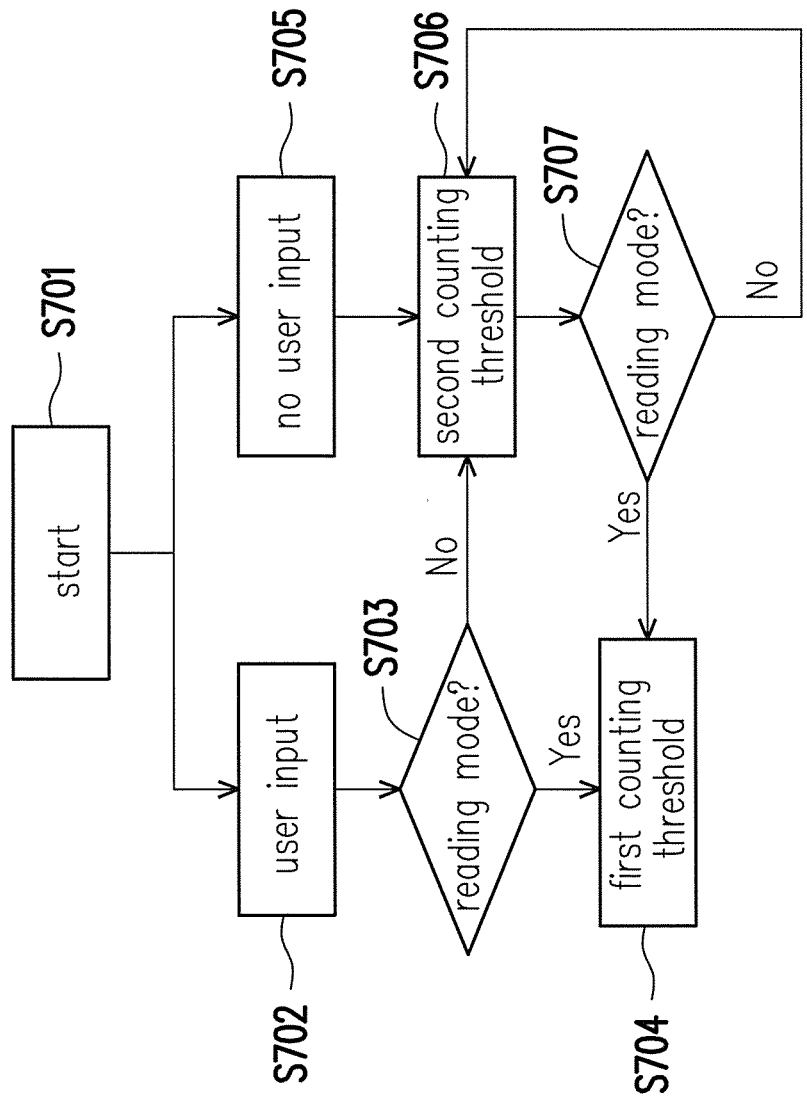
FIG. 7 illustrates the procedure of select a first counting threshold or a second counting threshold based on the presence of user inputs in accordance with one of the exemplary embodiments of the present disclosure.

FIG. 6 and FIG. 7 are two different exemplary embodiments which takes user input into account. According to the exemplary embodiment of FIG. 7, when there is user input received by the touch screen 303 or the user interface 304 (e.g. hardware buttons), the processing circuit 301 would adopt the first counting threshold which has been described as the longer counting threshold than the second counting threshold. In step S601, the start of the procedure would be considered from the point in time when the handheld electronic device 300 first came off the power saving mode or could be in the point in time when the handheld electronic device 200 first exits a screen lock or could be the point in time when the power button has been pressed to activate the non-power saving mode or normal mode. In step S601, the second counting threshold could be considered as default. Next, the procedure would branch of to the situations in which input signal has been detected or not detected within the second counting threshold. For example, if the user operates on the touch screen, the procedure would proceed to step S605. If the user does not operate on the touch screen, the procedure would proceed in step S602. Considering the latter case, if the user does not enter any input at all, step S602 and then S603 would be executed. In step S603, the processing circuit 301 would determine whether the handheld electronic device 300 is in reading mode or not. If there were no user input in step S602 and the device is not in reading mode in step S603, then in step S604, the second counting threshold would be used. The second counting threshold for example could be set as 10 seconds. After the expiration of the ten seconds during which neither a user input was made nor the reading mode was entered, the handheld electronic device 300 would enter the power saving mode. If then during the 10 seconds period the user re-adjust the tilt so that the reading mode is entered, or if the user operates the touch screen or hits a button, the second counting threshold or the 10 seconds period would be changed to the first counting threshold (e.g. 1 minute). But if the reading mode was entered in step S603, the first counting threshold would be adopted. The first counting threshold for example could be set as a minute or so. Subsequently, if there is no user input and the read mode has been entered, the processing circuit would execute step S606 after which the power saving mode would be activated after one minute of inactivity has been reached.

Considering the case of S605 where a user input is made after the step S601, the procedure would proceed in step S606. This means that whenever a user pushes a button or operates the touch screen, the first counting threshold would be configured. The sleep mode would then be entered after one minute of inactivity.

Optionally, when the first counting threshold in step S606 has been configured, the configured counting threshold could be changed from the first counting threshold to the second count threshold during the circumstance in which a tilt detection is made and the handheld electronic device 300 is determined to not be in the reading mode. In this general case, the second counting threshold would replace the first counting threshold, and the sleep mode would be entered after 10 seconds of inactivity.

FIG. 7 illustrates an alternative embodiment which is different from FIG. 6. In step S701, the starting condition could that the screen lock has first been exited, a power button has been pressed to deactivate the power saving mode. The default counting threshold could either be the first counting threshold or the second counting threshold. Step S702 would be executed if input signal from the touch screen 303 or input interface 304 has been detected. In step S703, the processing circuit 301 would determine whether the device 300 is in a reading mode. If the device 300 is in the reading mode, then the first counting threshold would be used. In that case, the device would enter a power saving mode because of user inactivity for over the first counting period. Back in step S701, if no user input has been detected initially, steps S705 and S706 would be executed. In step S705, after no user input has been detected within the first default counting threshold period, in step S706 the second counting threshold would be used. In step S707, the processing circuit 301 would determine whether the device 300 is in the reading mode. If so, step S704 would be executed as the first counting period would be used; otherwise, step S706 would be executed as the second counting period would be used.

In FIG. 6, it would be assumed that for certain applications, being in the reading mode and receiving user input could be considered as two different behaviors. Suppose that a user input has been received, the user does not intend to read off the touch screen 303 in stillness but rather than user would be busy operating the touch screen 303. In that case, the first counting threshold would be used without first making an assessment on the tilting of the device 303, and as long as there is user input being detected without timing out, the first counting threshold would be used. The embodiment of FIG. 7 would be used for certain applications which requires user inputs such as flipping pages while reading. Therefore, in steps S701~S703, the processing circuit 701 would first make a determination whether there is user input. If so, it would determine the tilt to see if a reading mode has been entered before adopting one of the counting thresholds. If there is no user input, then the shorter threshold would be used right away without evaluating whether the device 300 is in a reading mode.

Figure 8:
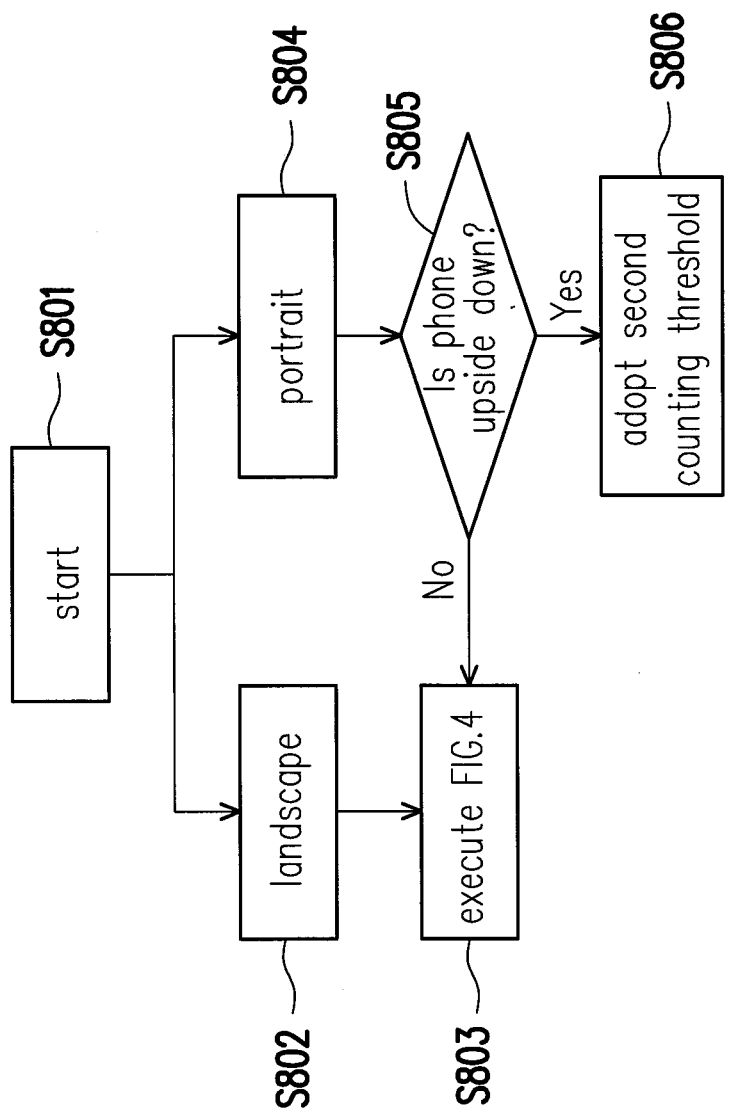
FIG. 8 is a flow chart which illustrates the effect of the device orientation on the selection of the counting threshold in accordance with one of the exemplary embodiments of the present disclosure.

FIG. 8 is a flow chart illustrating the procedure of the reading mode in portrait or landscape orientation in accordance with one of the exemplary embodiments of the present disclosure. In step S801, the screen lock and power saving mode would have been exited. Afterwards, whether the handheld electronic device 300 displays in landscape or portrait would be determined. If a user holds the handheld electronic device 300 horizontally, then in step S802 landscape mode is displayed. If a user holds the handheld electronic device 300 vertically, then in step S504 the portrait mode is display.

Considering in step S804, when portrait mode is being display, the handheld electronic device 300 would determine whether the phone is upside down. The electronic device 300 could for example be a smart phone. The upper side of the smart phone could be defined as the side where a speaker is located as the user usually would hold the smart phone in a position such that the speaker would be allowed to impart acoustic waves into the user's ear. The lower side of the smart phone could be defined as the side where a microphone is located. In step S804, if the smart phone is determined to be upside down, then in step S804, the user of the smart phone could be considered to not use the smart phone for reading purposes. In that case, the step S806 would be executed, and the second counting threshold which is the shorter of the two would be used. Otherwise, if the smart phone is not upside down in step S805 or in the case in step S804 where the user holds the phone in horizontal, then the procedure described in FIG. 6 would be executed.

Figure 9:
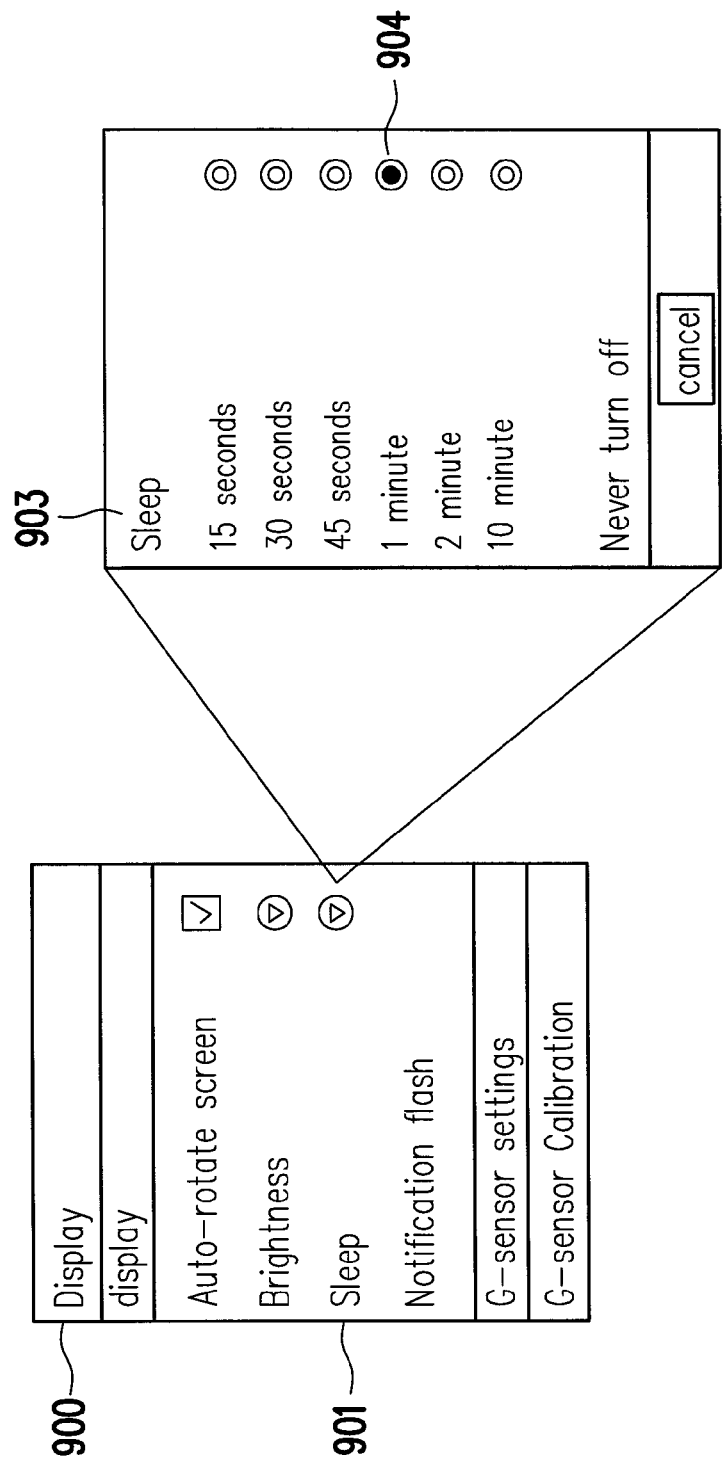
FIG. 9 illustrates a user interface for changing sleep mode settings in accordance with one of the exemplary embodiments of the present disclosure.

For a user of the smart phone, according to one exemplary embodiments, the user could have the ability to configure both of the counting thresholds (not shown). According to another exemplary embodiment, the user could set either one of the first and second counting thresholds in a settings menu. FIG. 9 illustrates a user interface for changing sleep mode settings in accordance with one of the exemplary embodiments of the present disclosure. One of the concepts of the smart sleep mode where the first counting threshold is correlated to the second counting threshold could be implemented. In FIG. 9, the user interface 900 could be brought up from a settings menu which contains an option to configure the display of a smart phone. Under the display menu 900, a user could configure the sleep timer which is the same as the counting threshold by selecting Sleep 901. After selecting Sleep 901, the sleep menu 903 would appear.

According to one of the exemplary embodiments, if one inactivity timer is selected, then the first counting threshold or the second counting threshold would be configured accordingly. For example, if the one minute inactivity timer 904 is selected, then it would be configured as the first counting threshold, and the second counting threshold would be configured automatically as the first counting threshold scaled by a factor 1/N where N could be 6 for example. This means that if one minute 904 is selected, the first counting threshold would be 60 seconds and the second counting threshold would be 60 divided by 6 and is therefore 10 seconds.

For another exemplary embodiment, if a longer timer from the menu 903 has been selected, then it would be considered as the first counting threshold, and subsequently the second counting threshold is the first counting threshold scaled by 1/N. At the same time, if a shorter time from the menu 903 has been selected, then it would be considered as the second counting threshold, and subsequently the first counting threshold is the second counting threshold scaled by a factor N. For example, if a user chooses 15 seconds from the sleep timer menu 903, then 15 seconds would be considered the second counting threshold and the first counting threshold would be 15 times N or 15 times 6 and is 90 seconds. If a user chooses 2 minutes, then it would be considered as the first counting threshold, and the second counting threshold would be 120 seconds divide by N or 6 and is 20 seconds.

In view of the aforementioned descriptions, the present disclosure proposes a reading mode which would be activated according to the tilting angle of a handheld electronic device or more specifically when the handheld electronic device is between a first tilting angle and a second tilting angle. Different sleep mode timers would be adopted for different circumstances as in the reading mode, the handheld electronic device would enter a sleep mode after a first predetermined period of inactivity. When the handheld electronic device is not in a reading mode, the device would enter the sleep mode after a second predetermined period of inactivity. Furthermore, the first counting period and the second counting period could be manually adjusted, but if one of the first and second predetermined period is adjusted in the menu, then the other one would automatically be adjusted accordingly.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A power saving method to be used by a handheld mobile electronic device with a touch screen comprising:
    determining whether any touch input is received within a second counting threshold;
    in response to not receiving any touch input within the second counting threshold:
        determining a tilting angle of the handheld mobile electronic device above and relative to a level surface by using a sensor;
        determining whether the tilting angle exceeds a first angle threshold and falls below a second angle threshold;
        using a first counting threshold and entering a reading mode when the tilting angle is above the first angle threshold and is below the second angle threshold, wherein in the reading mode, the handheld mobile electronic device does not darken or turn off the touch screen;
        using the second counting threshold which is less than the first counting threshold when the tilting angle falls below the first angle threshold or exceeds the second angle threshold;
        darkening the touch screen of the handheld mobile electronic device in response to the handheld mobile electronic using the first counting threshold but does not receive any touch input within the first counting threshold; and
        darkening the touch screen of the handheld mobile electronic device in response to the handheld mobile device using the second counting threshold but does not receiving any touch input within the second counting threshold; and
    using the first counting threshold when the handheld mobile electronic device is in a landscape orientation or in a right side up portrait orientation such that an speaker which is native to the handheld mobile electronic device is situated higher than a microphone which is native to the handheld mobile electronic device.

2. The method of claim 1, wherein the step of using the first counting threshold and entering the reading mode when the tilting angle is above the first angle threshold and is below the second angle threshold further comprises using the first counting threshold when any touch input is received within a non-zero default period.

3. The method of claim 2, wherein the step of using the second counting threshold which is less than the first counting threshold when the tilting angle falls below the first angle threshold or exceeds the second angle threshold further comprises using the second counting threshold when no touch input is received within the non-zero default period.

4. The method of claim 3 further comprises using the second counting threshold when the handheld mobile electronic device is in an upside down portrait orientation such that the microphone which is native to the handheld mobile electronic device is situated higher than the speaker which is native to the handheld mobile electronic device.

5. The method of claim 1, wherein the second counting threshold is configured through a menu from a list of discrete second counting thresholds.

6. The method of claim 1, in response to the second counting threshold is configured through the menu, the first counting threshold is scaled according to a non-zero linear proportion.

7. The method of claim 1, wherein the step of determining whether the tilting angle exceeds the first angle threshold and falls below the second angle threshold comprising determining whether the tilting angle exceeds the first angle threshold which is 30 degrees above and relative to the level surface and falls below the second angle threshold which is 150 degrees above and relative to the level surface.

8. The method of claim 1, wherein the first counting threshold is one minute, and the second counting threshold is 10 seconds.

9. The method of claim 1, wherein the sensor is a G-sensor.

10. A handheld electronic device comprising:
    a touch screen;
    a G-sensor; and
    a processing circuit coupled to the touch screen and the G-sensor and is configured for:
        determining whether any input is received within a second counting threshold;
        in response to not receiving any input within the second counting threshold:
            determining a tilting angle of the handheld mobile electronic device above and relative to a level surface by using the G-sensor sensor;
            determining based on outputs from the G-sensor whether the tilting angle exceeds a first angle threshold and falls below a second angle threshold;
            using a first counting threshold and entering a reading mode when the tilting angle is above the first angle threshold and is below the second angle threshold, wherein in the reading mode, the handheld mobile electronic device does not darken or turn off the touch screen;

using the second counting threshold which is less than the first counting threshold when the tilting angle falls below the first angle threshold or exceeds the second angle threshold;

darkening the touch screen in response to the processing circuit using the first counting threshold but does not receive any touch input within the first counting threshold; and darkening the touch screen in response to the processing circuit using the second counting threshold but does not receiving any input within the second counting threshold; and using the first counting threshold when the handheld mobile electronic device is in a landscape orientation or in a right side up portrait orientation such that an speaker which is native to the handheld mobile electronic device is situated higher than a microphone which is native to the handheld mobile electronic device.

11. The device of claim 10, wherein the processing circuit is further configured for using the first counting threshold and entering a reading mode when the tilting angle is above the first angle threshold and is below the second angle threshold and a touch input is received within a non-zero default period.

12. The device of claim 11, wherein the processing circuit is further configured for using the second counting threshold which is less than the first counting threshold when the tilting angle falls below the first angle threshold or exceeds the second angle threshold and when no touch input is received within the non-zero default period.

13. The device of claim 12, wherein the processing circuit is further configured for using the second counting threshold when the handheld mobile electronic device is in an upside down portrait orientation such that the microphone which is native to the handheld mobile electronic device is situated higher than the speaker which is native to the handheld mobile electronic device.

14. The device of claim 10, wherein the second counting threshold is configured through a menu from a list of discrete second counting thresholds displayed on the touch screen.

15. The device of claim 10, in response to the second counting threshold is configured through the menu displayed on the touch screen, the processing circuit scales the first counting threshold according to a non-zero linear proportion.

16. The device of claim 10, wherein the processing circuit is configured for determining whether the tilting angle exceeds the first angle threshold and falls below the second angle threshold comprising determining whether the tilting angle exceeds the first angle threshold which is 30 degrees above and relative to the level surface and falls below the second angle threshold which is 150 degrees above and relative to the level surface.

17. The device of claim 10, wherein the processing circuit configures first counting threshold as one minute, and the processing circuit configures the second counting threshold as 10 seconds.

18. A non-transitory storage medium which stores a plurality of computer readable programming codes to be loaded into a handheld electronic device to execute functions comprising:

determining whether any touch input is received within a second counting threshold;

in response to not receiving any touch input within the second counting threshold:

determining a tilting angle of the handheld mobile electronic device above and relative to a level surface by using a sensor;

determining whether the tilting angle exceeds a first angle threshold and falls below a second angle threshold;

using a first counting threshold and entering a reading mode when the tilting angle is above the first angle threshold and is below the second angle threshold, wherein in the reading mode, the handheld mobile electronic device does not darken or turn off the touch screen;

using the second counting threshold which is less than the first counting threshold when the tilting angle falls below the first angle threshold or exceeds the second angle threshold;

darkening the touch screen of the handheld mobile electronic device in response to the handheld mobile electronic using the first counting threshold but does not receive any touch input within the first counting threshold; and darkening the touch screen of the handheld mobile electronic device in response to the handheld mobile device using the second counting threshold but does not receiving any touch input within the second counting threshold; and using the first counting threshold when the handheld mobile electronic device is in a landscape orientation or in a right side up portrait orientation such that an speaker which is native to the handheld mobile electronic device is situated higher than a microphone which is native to the handheld mobile electronic device.

19. The method of claim 1, wherein the tilting angle is determined according to an angle between an axis normal to the level surface and an axis normal to the touch screen.

* * * * *